(12) United States Patent
Iwasaki et al.

(10) Patent No.: US 12,083,638 B2
(45) Date of Patent: Sep. 10, 2024

(54) FASTENING METHOD OF FASTENING COMPONENT

(71) Applicant: Honda Motor Co., Ltd., Tokyo (JP)

(72) Inventors: Tomonori Iwasaki, Tokyo (JP); Masaya Sakano, Tokyo (JP); Maiko Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 124 days.

(21) Appl. No.: 18/152,155

(22) Filed: Jan. 10, 2023

(65) Prior Publication Data
US 2023/0241730 A1   Aug. 3, 2023

(30) Foreign Application Priority Data
Feb. 10, 2022   (CN) .......................... 202210124724.1

(51) Int. Cl.
*B23P 19/06*   (2006.01)
(52) U.S. Cl.
CPC .................................. *B23P 19/06* (2013.01)

(58) Field of Classification Search
CPC ... B25B 23/007; B25B 23/0035; B25B 13/00; B25B 13/06; B25B 13/16; B23P 19/06
See application file for complete search history.

(56) References Cited

FOREIGN PATENT DOCUMENTS

JP          H02224934          9/1990

*Primary Examiner* — Lee A Holly
(74) *Attorney, Agent, or Firm* — JCIPRNET

(57) ABSTRACT

A fastening method of a fastening component includes: an installation step of installing the fastening component to an upper end of a spindle; a first pressing step of raising a nut runner shaft while reversely rotating the nut runner shaft in a rotating direction opposite to a fastening direction to press the nut runner shaft against a non-circular fitting portion; a second pressing step of raising the nut runner shaft while reversely rotating the nut runner shaft in the rotating direction opposite to the fastening direction to press the fastening component against a workpiece; and a fastening step of rotating the nut runner shaft forward in the fastening direction after the nut runner shaft is fitted into the fitting portion of the spindle.

2 Claims, 9 Drawing Sheets

FASTENING METHOD OF FASTENING COMPONENT

CROSS-REFERENCE TO RELATED APPLICATION

This application claims the priority benefit of China application no. 202210124724.1, filed on Feb. 10, 2022. The entirety of the above-mentioned patent application is hereby incorporated by reference herein and made a part of this specification.

BACKGROUND

Technical Field

The disclosure relates to a fastening method of a fastening component.

Description of Related Art

In the related art, in the process of automatically fastening a fastening component (e.g., a bolt) by using a spindle and a nut runner shaft, the spindle is usually coupled to the nut runner shaft through a fitting portion, and the spindle is used to fasten the fastening component to the workpiece. In this process, the fitting between the spindle on which the fastening component has been installed and the nut runner shaft is usually performed when the nut runner shaft performs forward rotation (that is, the nut runner shaft rotates in the fastening direction). However, such an approach may cause a problem that forward rotation is continued in a state in which the spindle and the nut runner shaft are not fitted. Further, the fastening component is fastened through rotation, so that when the spindle and the nut runner shaft are raised, detachment of the spindle may occur in a state where the spindle and the nut runner shaft are fitted. Therefore, it is necessary to improve the fastening method of the fastening component to overcome the above problems.

SUMMARY

The disclosure provides a fastening method of a fastening component, using a spindle to fasten the fastening component to a workpiece. An upper end of the spindle is provided with the fastening component, a lower end of the spindle has a non-circular fitting portion, and the fitting portion is configured to be fitted into a nut runner shaft. The fastening method of the fastening component includes the following steps. In an installation step, the fastening component is installed to the upper end of the spindle. In a first pressing step, the nut runner shaft is raised while being reversely rotated in a rotating direction opposite to a fastening direction to press the nut runner shaft against the non-circular fitting portion. In a second pressing step, the nut runner shaft is raised while being reversely rotated in the rotating direction opposite to the fastening direction to press the fastening component against the workpiece. In a fastening step, the nut runner shaft is rotated forward in the fastening direction after the nut runner shaft is fitted into the fitting portion of the spindle.

In order to make the aforementioned and other features and advantages of the invention more comprehensible, several embodiments accompanied with figures are described in detail below.

DESCRIPTION OF THE EMBODIMENTS

Figure 1:
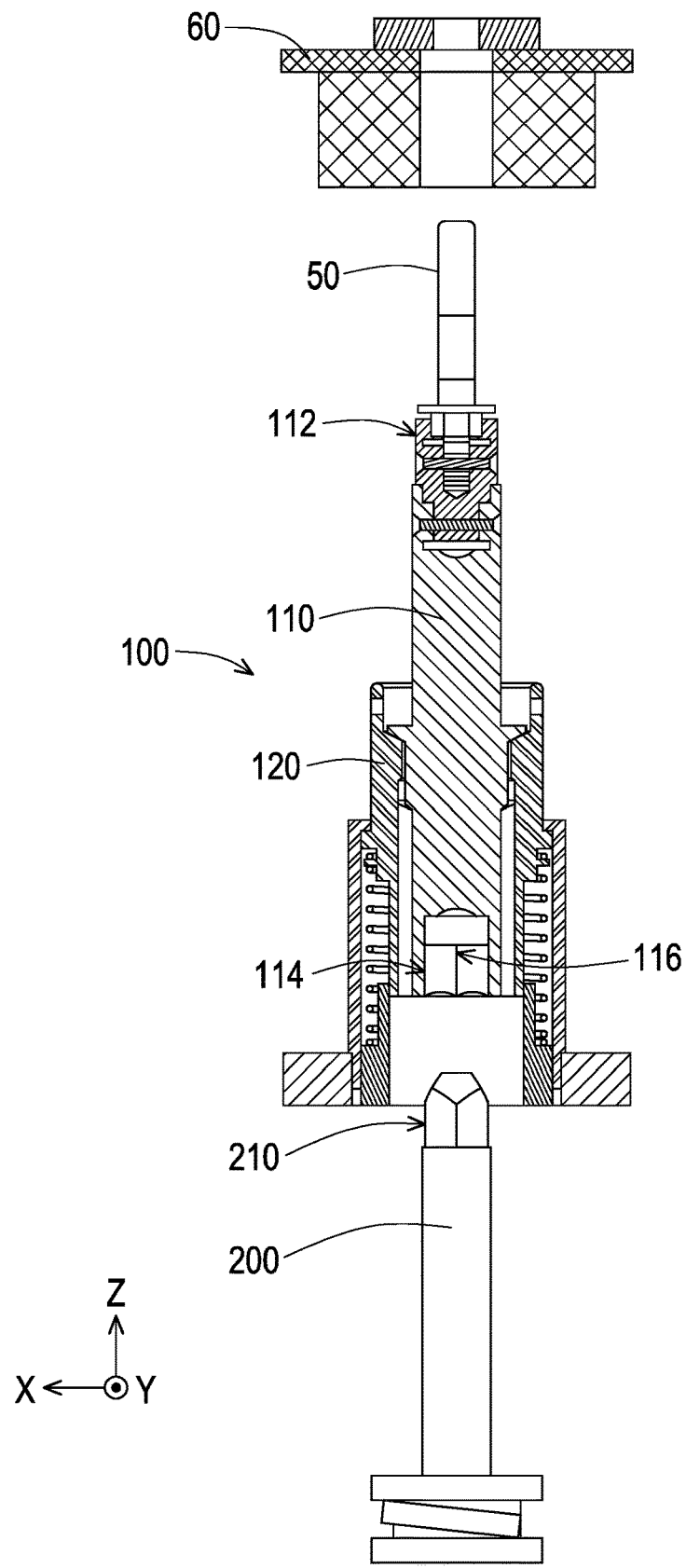
FIG. 1 is a schematic side view of a spindle device and a nut runner shaft used in a fastening method of a fastening component according to an embodiment of the disclosure.

The disclosure provides a fastening method of a fastening component through which the fastening component is prevented from being improperly fastened, and the fastening time required for the fastening component is shortened.

The disclosure provides a fastening method of a fastening component, using a spindle to fasten the fastening component to a workpiece. An upper end of the spindle is provided with the fastening component, a lower end of the spindle has a non-circular fitting portion, and the fitting portion is configured to be fitted into a nut runner shaft. The fastening method of the fastening component includes the following steps. In an installation step, the fastening component is installed to the upper end of the spindle. In a first pressing step, the nut runner shaft is raised while being reversely rotated in a rotating direction opposite to a fastening direction to press the nut runner shaft against the non-circular fitting portion. In a second pressing step, the nut runner shaft is raised while being reversely rotated in the rotating direction opposite to the fastening direction to press the fastening component against the workpiece. In a fastening step, the nut runner shaft is rotated forward in the fastening direction after the nut runner shaft is fitted into the fitting portion of the spindle.

In an embodiment of the disclosure, the fastening method of the fastening component further includes the following steps. In a third pressing step, the nut runner shaft is raised again when the contact between the fastening component and the workpiece is released to press the fastening component against the workpiece after the second pressing step. Further, after the third pressing step, the fastening step is performed.

To sum up, in the fastening method of the fastening component provided by the disclosure, the fastening component is installed to the upper end of the spindle. The nut runner shaft is then raised while being rotated reversely to press the nut runner shaft against the non-circular fitting portion. Next, the nut runner shaft is raised while being rotated reversely to press the fastening component against the workpiece. In this way, when the nut runner shaft and the fitting portion of the spindle have not yet been fitted, even if the fastening component is pressed against the workpiece, the nut runner shaft continues to rotate reversely until after the nut runner shaft is fitted into the fitting portion of the spindle, and the nut runner shaft is then rotated forward to fasten the fastening component to the workpiece. In this way, the fastening component is prevented from being improperly fastened. Further, compared to a case where poor fitting occurs during forward rotation, the adjustment time from the state of improper fitting to the state of mutual fitting is short, so that the required fastening time can be shortened. Accordingly, in the fastening method of the fastening component provided by the disclosure, the fastening component may be prevented from being improperly fastened, and the fastening time required for the fastening component can be shortened.

Figure 2:
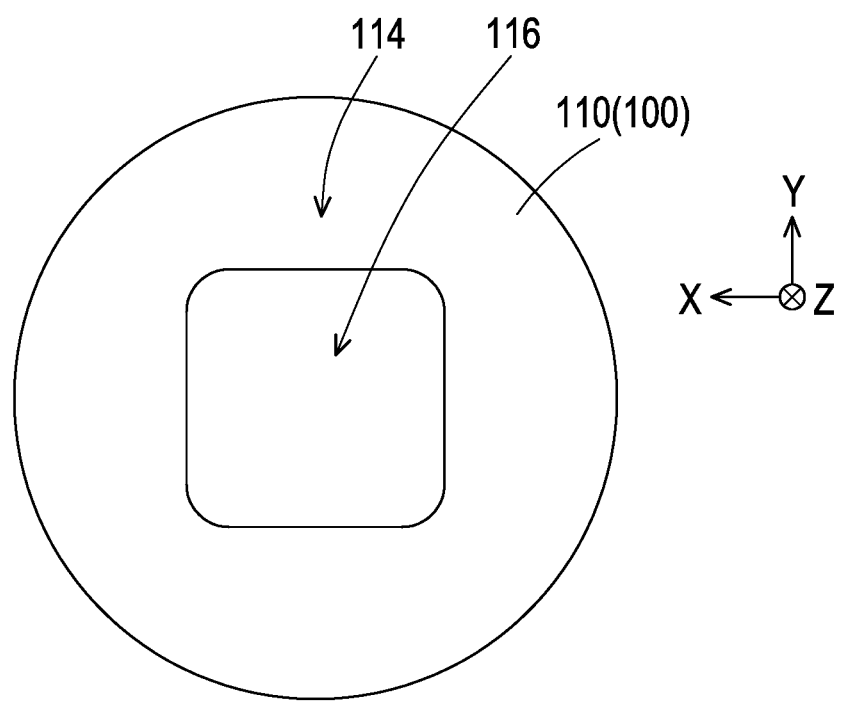
FIG. 2 is a schematic bottom view of a spindle used in the spindle device shown in FIG. 1.
Figure 3:
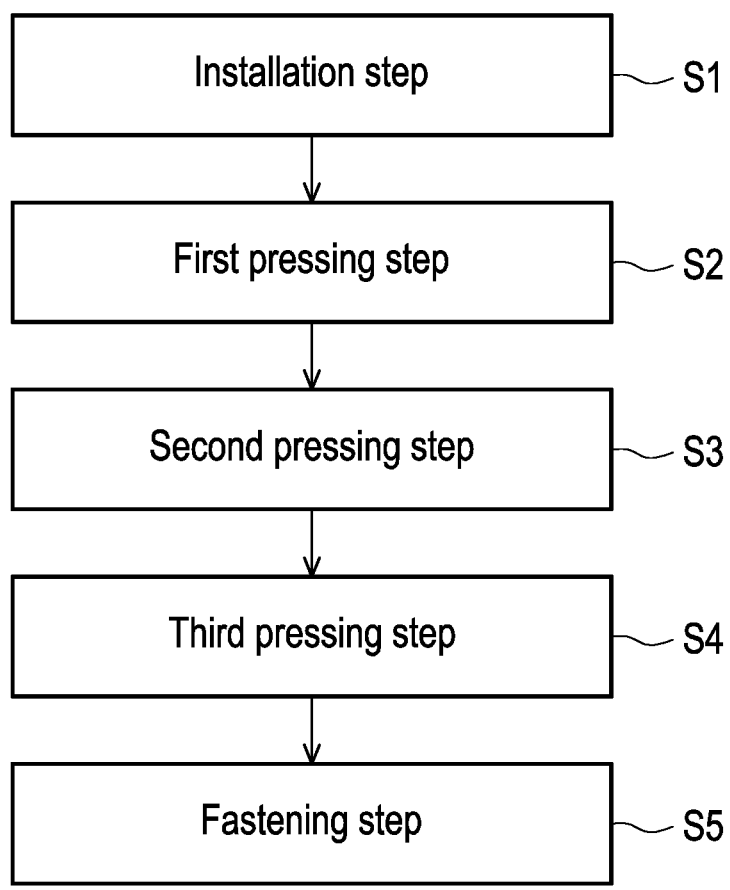
FIG. 3 is a flow chart of the fastening method of the fastening component of the spindle device and the nut runner shaft shown in FIG. 1.

Descriptions of the disclosure are given with reference to the exemplary embodiments illustrated by the accompanying drawings. Herein, FIG. 1 is a schematic side view of a spindle device and a nut runner shaft used in a fastening method of a fastening component according to an embodiment of the disclosure. FIG. 2 is a schematic bottom view of a spindle used in the spindle device shown in FIG. 1. FIG. 3 is a flow chart of the fastening method of the fastening component of the spindle device and the nut runner shaft shown in FIG. 1. FIG. 4A to FIG. 4F are schematic views of the operation flow of the fastening method of the fastening component shown in FIG. 3. A fastening method of a fastening component provided by the present embodiment will be described below together with FIG. 1 to FIG. 4F. FIG. 1, FIG. 2, and FIG. 4A to FIG. 4F show axial directions X, Y, and Z to further illustrate the relative positions of the components in the three-dimensional space to be mentioned in the following paragraphs, but this is only one example of the disclosure, and the disclosure is not limited thereto.

With reference to FIG. 1 and FIG. 2, in this embodiment, a fastening method of a fastening component 50 is a method of fastening the fastening component 50 onto a workpiece 60 by using a spindle 110 in a spindle device 100. An upper end 112 of the spindle 110 is provided with the fastening component 50, a lower end 114 of the spindle 110 has a non-circular fitting portion 116 (shown as a square hole in FIG. 2 but not limited thereto), and the fitting portion 116 is configured to be fitted into a nut runner shaft 200.

Further, in this embodiment, the spindle device 100 includes the spindle 110 and a housing 120, and the housing 120 slidably supports the spindle 110 in an up-down direction (i.e., the axial direction Z). That is, the spindle 110 can slide in the up-down direction along an inner side surface of the housing 120. Herein, the fastening component 50 is, for example, a bolt (not limited thereto) and is installed on the upper end 112 of the spindle 110. The nut runner shaft 200 is provided with a corresponding fitting portion 210, for example, and may be fitted with the fitting portion 116 provided at the lower end 114 of the spindle 110. However, the implementation of the spindle 110 is not limited in the disclosure (for example, not limited to having the housing 120 for the spindle 110 to slide up and down), which can be adjusted according to needs.

Further, in this embodiment, the nut runner shaft 200 may be driven to rotate by a driving source which is not shown. During the rotation of the nut runner shaft 200, the nut runner shaft 200 raises, is pressed against the non-circular fitting portion 116, and further pushes the spindle 110 upwards to press the fastening component 50 against the workpiece 60. Herein, the action of rotating the nut runner shaft 200 in a fastening direction for fastening the fastening component 50 onto the workpiece 60 is referred to as forward rotation (e.g., rotating clockwise along the Z axis). The action of rotating the nut runner shaft 200 in a rotating direction opposite to the fastening direction is referred to as reverse rotation (e.g., rotating counterclockwise along the Z axis). However, the disclosure is not limited thereto.

Ideally, the fitting portion 210 of the nut runner shaft 200 is fitted with the fitting portion 116 of the spindle 110, so that the spindle 110 and the fastening component 50 installed on the upper end 112 of the spindle 110 rotate and raise together with the rotation and raising of the nut runner shaft 200, After contacting the workpiece 60, the fastening component is further twisted into the workpiece 60 by being rotated, so that the fastening component 50 is fastened to the workpiece 60. However, when the nut runner shaft 200 is raised, poor fitting due to the phase problem of rotation and the like may occur (i.e., the fitting portion 210 of the nut runner shaft 200 and the fitting portion 116 of the spindle 110 are not yet fitted), resulting in poor fastening of the fastening component 50. Therefore, the present embodiment provides the following fastening method of the fastening component 50 to overcome the above problems.

With reference to FIG. 3, in this embodiment, the fastening method of the fastening component 50 includes the following steps. In an installation step S1, the fastening component 50 is installed to the upper end 112 of the spindle 110. In a first pressing step S2, the nut runner shaft 200 is raised while being reversely rotated in the rotating direction opposite to the fastening direction to press the nut runner shaft 200 against the non-circular fitting portion 116. In a second pressing step S3, the nut runner shaft 200 is raised while being reversely rotated in the rotating direction opposite to the fastening direction to press the fastening component 50 against the workpiece 60. In a third pressing step S4, after the second pressing step S3, the nut runner shaft 200 is raised again when the contact between the fastening component 50 and the workpiece 60 is released to press the fastening component 50 against the workpiece 60. Further, after the third pressing step S4, a fastening step S5 is performed. In the fastening step S5, the nut runner shaft 200 is rotated forward in the fastening direction after the nut runner shaft 200 is fitted into the fitting portion 116 of the spindle 110.

Figure 4A:
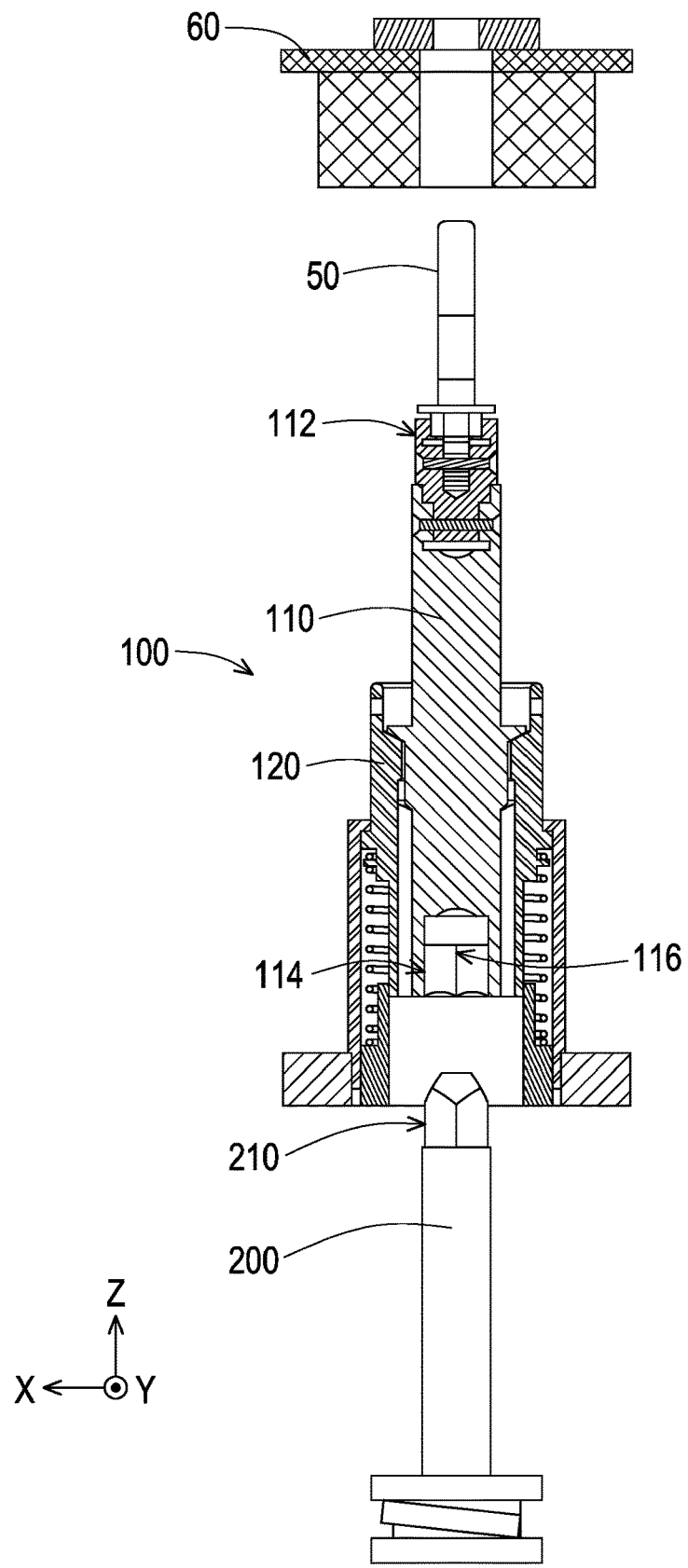
FIG. 4A to FIG. 4F are schematic views of the operation flow of the fastening method of the fastening component shown in FIG. 3.

To be specific, first, as shown in FIG. 3 and FIG. 4A, in the installation step S1, the fastening component 50 is installed to the upper end 112 of the spindle 110. That is, in this embodiment, the fastening method of the fastening component 50 is to install the fastening component 50 to the upper end 112 of the spindle 110 before the nut runner shaft 200 and the fitting portion 116 of the spindle 110 is fitted. As such, the subsequent steps may be continued while the fastening component 50 remains installed on the upper end 112 of the spindle 110.

Figure 4B:
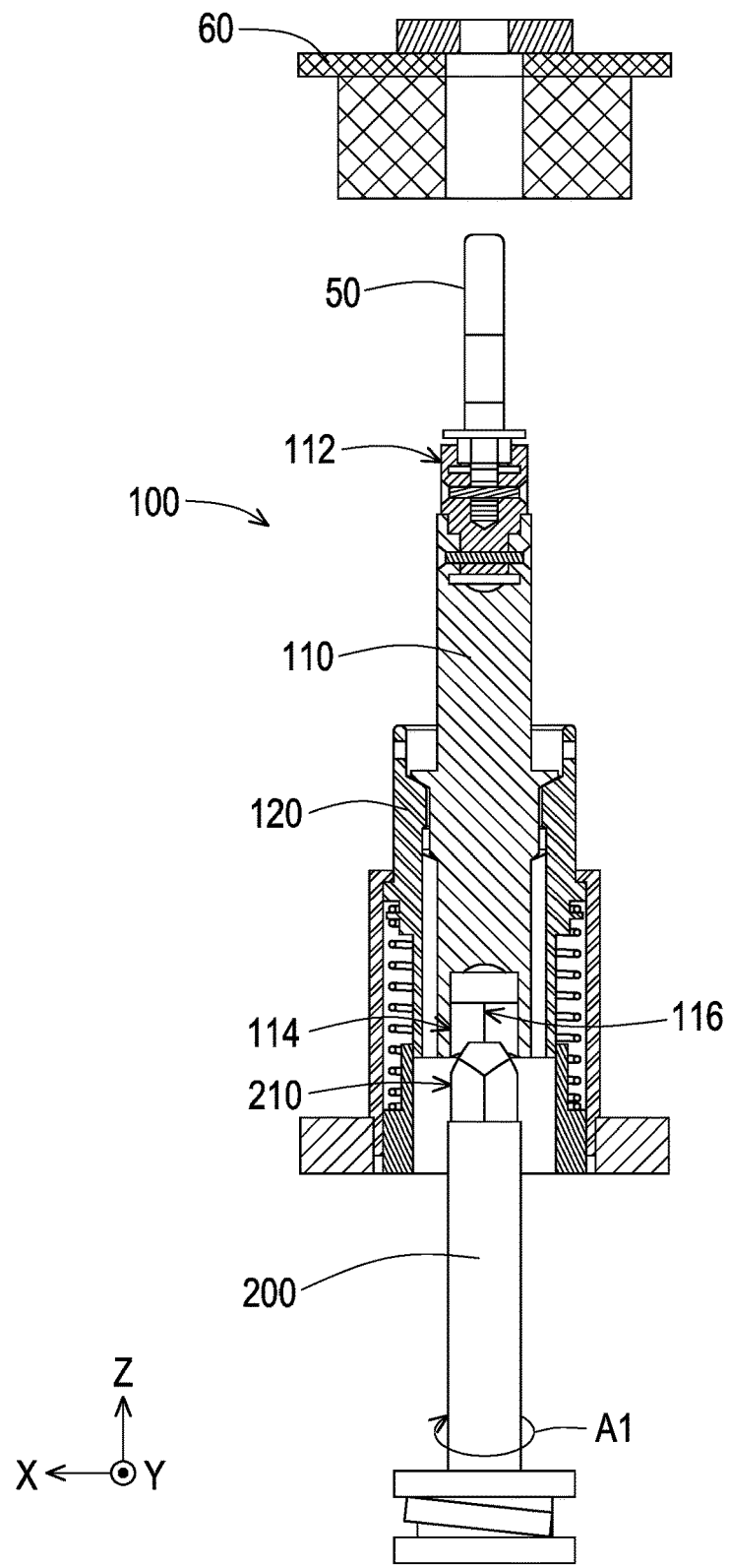

Next, as shown in FIG. 3 and FIG. 4B, after the installation step S1, in the first pressing step S2, the nut runner shaft 200 is raised while being reversely rotated (e.g., in the direction indicated by arrow A1 in FIG. 4B) in the rotating direction opposite to the fastening direction to press the nut runner shaft 200 against the non-circular fitting portion 116. That is, the nut runner shaft 200 is raised while being rotated reversely, thereby entering the housing 120 of the spindle device 100 and pressing against the non-circular fitting portion 116. Herein, the description is given on the assumption that the nut runner shaft 200 is only pressed against the non-circular fitting portion 116 and the fitting portion 210 of the nut runner shaft 200 and the fitting portion 116 of the spindle 110 are not yet fitted.

Figure 4C:
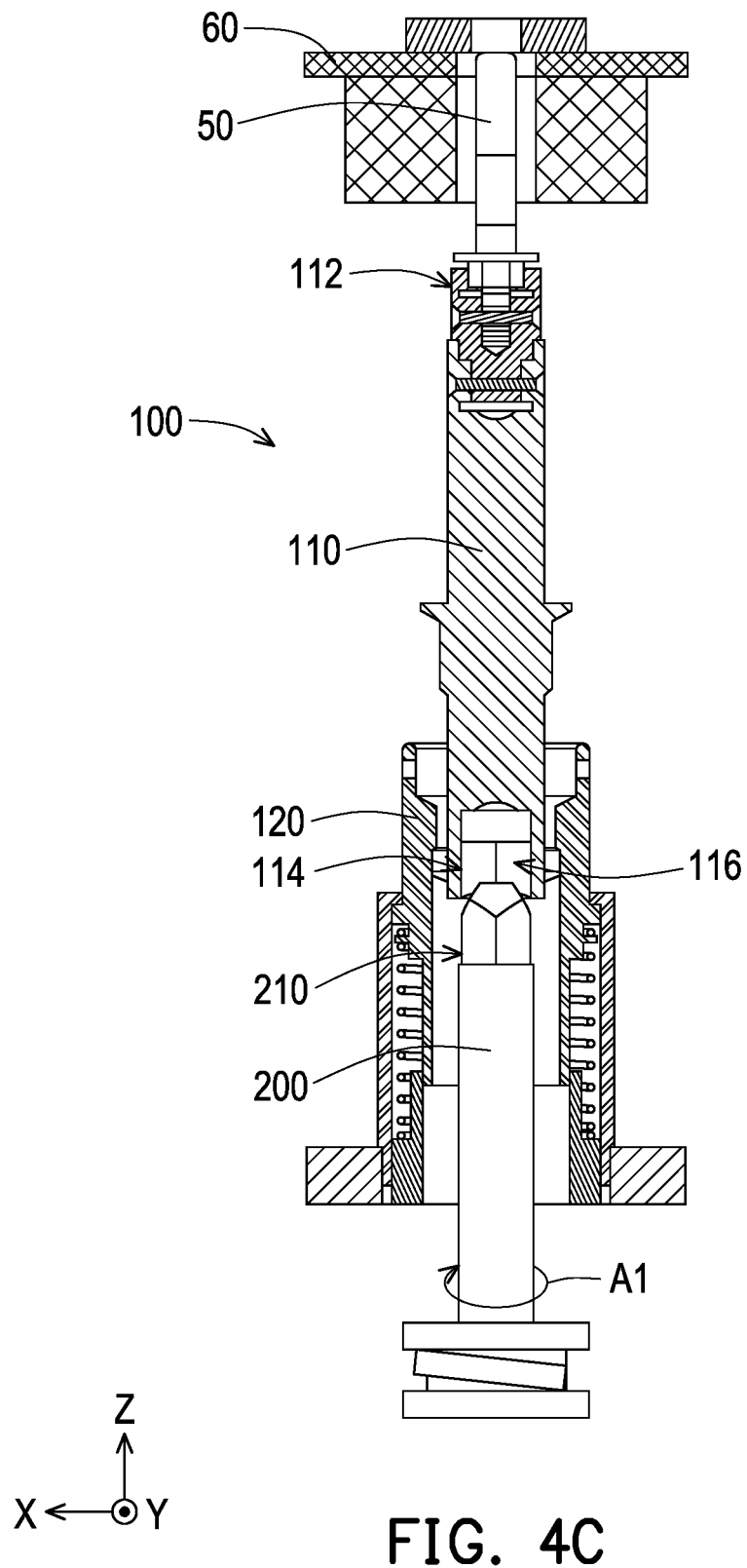

Next, as shown in FIG. 3 and FIG. 4C, after the first pressing step S2, in the second pressing step S3, the nut runner shaft 200 is raised while being reversely rotated (e.g., in the direction indicated by arrow A1 in FIG. 4C) in the rotating direction opposite to the fastening direction to press the fastening component 50 against the workpiece 60. That is, the nut runner shaft 200 is raised while being rotated reversely, thereby pushing the spindle 110 to slide relative to the housing 120. Further, the spindle 110 and the fastening component 50 installed on the spindle 110 are raised, and the fastening component 50 is pressed against the workpiece 60. At this time, the fitting portion 210 of the nut runner shaft 200 and the fitting portion 116 of the spindle 110 are not yet fitted. As such, the spindle 110 and the fastening component 50 installed on the spindle 110 are pushed to raise while rotating reversely. However, since the spindle 110 and the fastening component 50 rotate in the rotating direction opposite to the fastening direction, the fastening component 50 has not yet been twisted into the workpiece 60. Therefore, in both the first pressing step S2 and the second pressing step S3, the nut runner shaft 200 is raised while rotating reversely, so that the first pressing step S2 and the second pressing step S3 can be continuous actions without pause. However, the disclosure is not limited thereto.

Figure 4D:
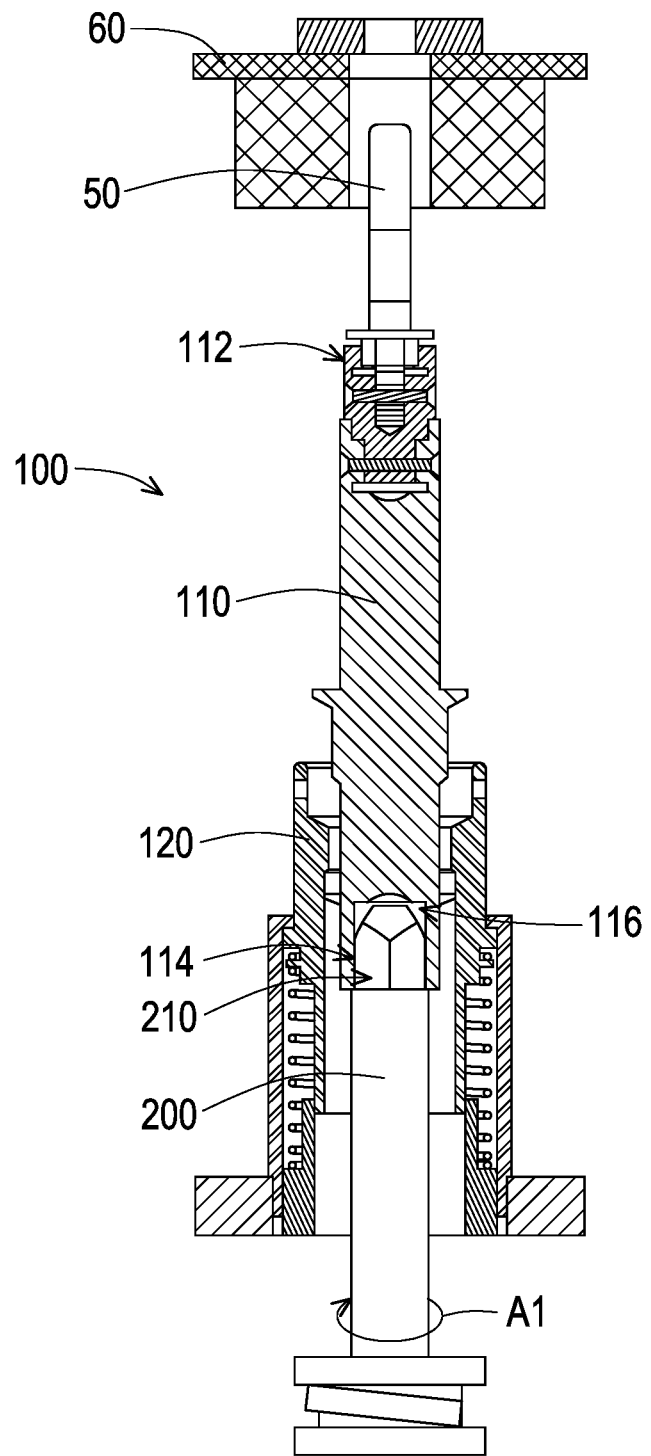
Figure 4E:
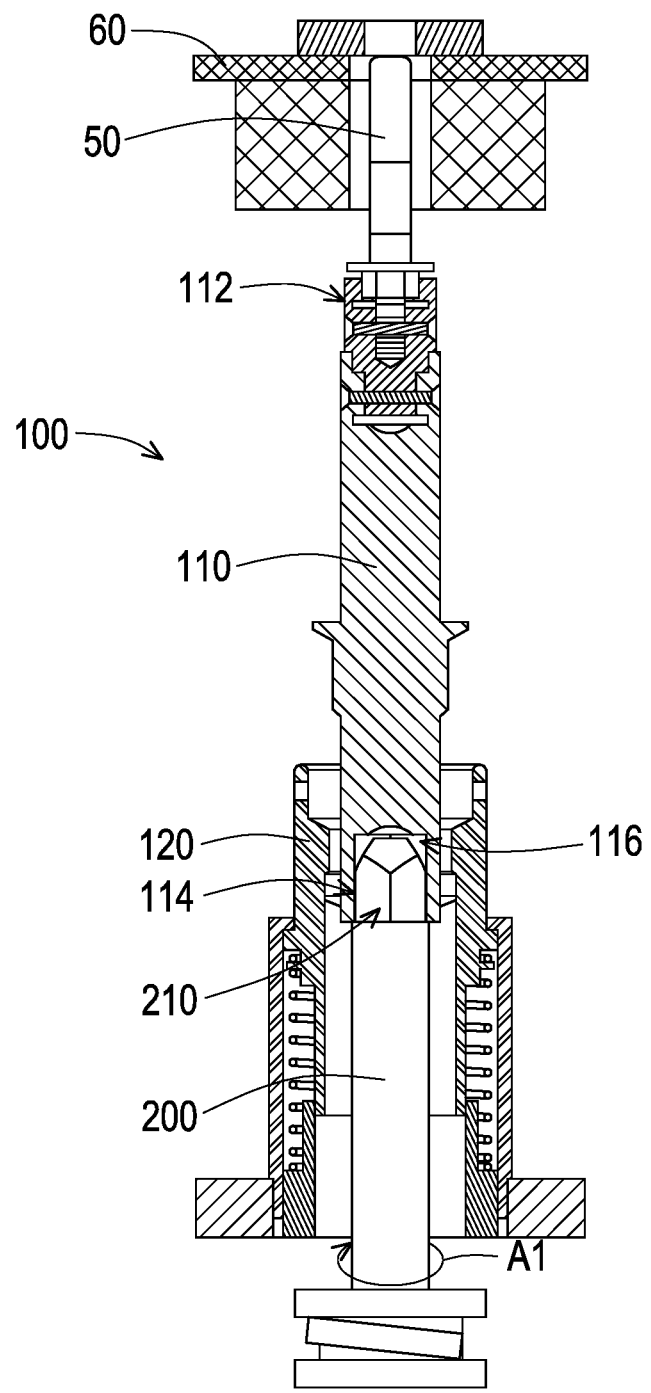

Next, as shown in FIG. 3, FIG. 4D, and FIG. 4E, after the second pressing step S3, in the third pressing step S4, the nut runner shaft 200 is raised again when the contact between the fastening component 50 and the workpiece 60 is released to press the fastening component 50 against the workpiece 60. That is, after the second pressing step S3, the fastening component 50 is pressed against the workpiece 60 and the rotation of the spindle 110 is suppressed through friction. When the reversely-rotating nut runner shaft 200 rotates to a specific phase, the fitting portion 116 of the spindle 110 corresponds to the fitting portion 210 of the nut runner shaft 200. The spindle 110 is lowered by gravity, and the fitting portion 210 of the nut runner shaft 200 and the fitting portion 116 of the spindle 110 are fitted into each other. Since the fitting portion 210 of the nut runner shaft 200 is fitted into the fitting portion 116 of the spindle 110, the fastening component 50 is released from the contact with the workpiece 60 as the spindle 110 descends (as shown in FIG. 4D). Therefore, at this time, it is preferable to raise the nut runner shaft 200 again while rotating the nut runner shaft 200 reversely to press the fastening component 50 against the workpiece 60 again (as shown in FIG. 4E).

Figure 4F:
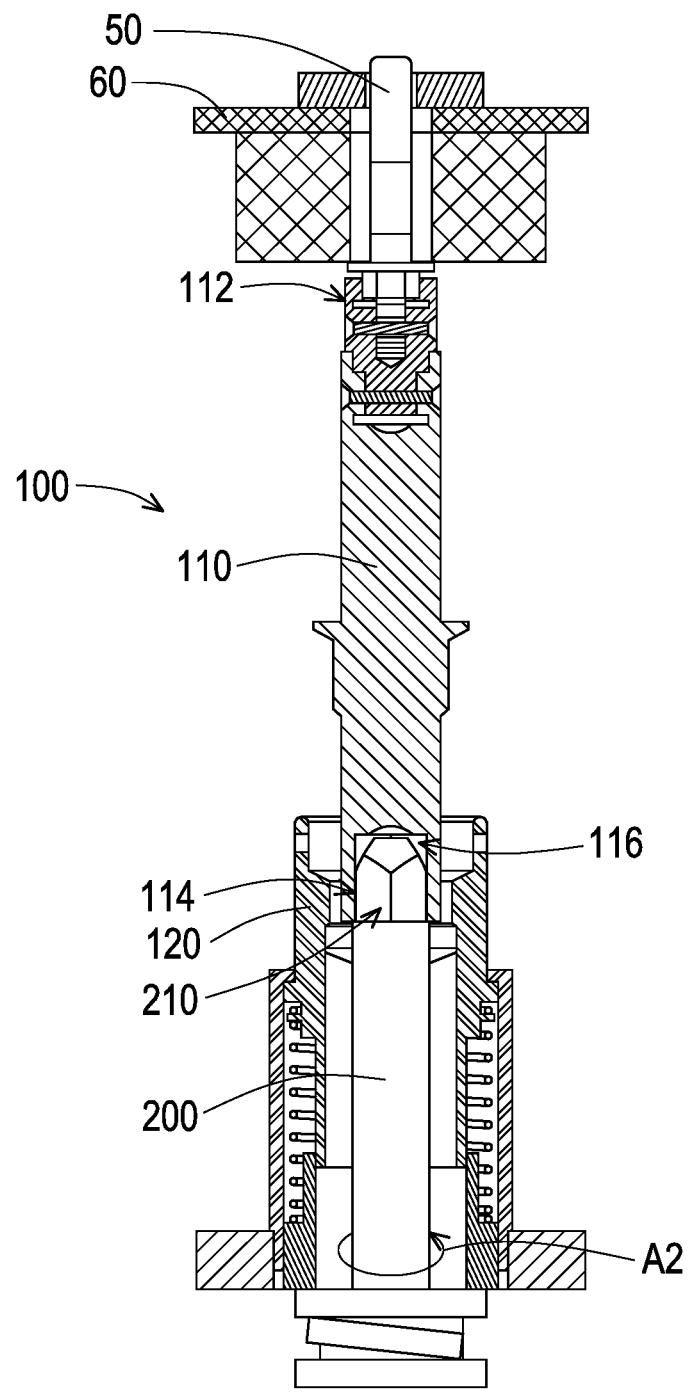

Finally, as shown in FIG. 3 and FIG. 4F, after the third pressing step S4, the fastening step S5 is performed. In the fastening step S5, the nut runner shaft 200 is rotated forward in the fastening direction (in the direction indicated by arrow A2 in FIG. 4F) after the nut runner shaft 200 is fitted into the fitting portion 116 of the spindle 110. That is, since the nut runner shaft 200 is fitted into the fitting portion 116 of the spindle 110, the nut runner shaft 200 raises while rotating forward and pushes the spindle 110 and the fastening component 50 installed on the spindle 110 to also raise while rotating forward. The forward rotation means the action of rotating the nut runner shaft 200 in the fastening direction for fastening the fastening component 50 onto the workpiece 60. Therefore, the fastening component 50 rotates in the fastening direction during the forward rotation, so as to be further twisted into the workpiece 60 through the rotation, and the fastening component 50 is thus fastened on the workpiece 60. However, in the disclosure, it is not limited whether the third pressing step S4 is performed or not. After the second pressing step S3, if the contact between the fastening component 50 and the workpiece 60 is not released (i.e., the fitting portion 210 of the nut runner shaft 200 is fitted with the fitting portion 116 of the spindle 110), the third pressing step S4 may not be performed to raise the nut runner shaft 200 again, and the fastening step S5 may be performed directly.

It thus can be seen that in this embodiment, the fastening component 50 is installed to the upper end 112 of the spindle 110 before the nut runner shaft 200 and the fitting portion 116 of the spindle 110 are fitted. The nut runner shaft 200 is then raised while being rotated reversely, so that the nut runner shaft 200 is pressed against the non-circular fitting portion 116, and then the fastening component 50 is pressed against the workpiece 60. In this way, when the nut runner shaft 200 and the fitting portion 116 of the spindle 110 have not yet been fitted, even if the fastening component 50 is pressed against the workpiece 60, the nut runner shaft 200 continues to rotate reversely until after the nut runner shaft 200 is fitted into the fitting portion 116 of the spindle 110, and the nut runner shaft 200 is then rotated forward to fasten the fastening component 50 to the workpiece 60. In this way, the fastening component 50 is prevented from being improperly fastened. Further, compared to a case where poor fitting occurs during forward rotation, the adjustment time from the state of improper fitting to the state of mutual fitting is short, so that the required fastening time can be shortened. Accordingly, in the fastening method of the fastening component 50, the fastening component 50 may be prevented from being improperly fastened, and the fastening time required for the fastening component 50 can be shortened.

In view of the foregoing, in the fastening method of the fastening component provided by the disclosure, the fastening component is installed to the upper end of the spindle. The nut runner shaft is then raised while being rotated reversely to press the nut runner shaft against the non-circular fitting portion. Next, the nut runner shaft is raised while being rotated reversely to press the fastening component against the workpiece. Preferably, when the contact between the fastening component and the workpiece is released, the nut runner shaft is raised again to press the fastening component against the workpiece. In this way, when the nut runner shaft and the fitting portion of the spindle have not yet been fitted, even if the fastening component is pressed against the workpiece, the nut runner shaft continues to rotate reversely until after the nut runner shaft is fitted into the fitting portion of the spindle, and the nut runner shaft is then rotated forward to fasten the fastening component to the workpiece. In this way, the fastening component is prevented from being improperly fastened. Further, compared to a case where poor fitting occurs during forward rotation, the adjustment time from the state of improper fitting to the state of mutual fitting is short, so that the required fastening time can be shortened. Accordingly, in the fastening method of the fastening component provided by the disclosure, the fastening component may be prevented from being improperly fastened, and the fastening time required for the fastening component can be shortened.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A fastening method of a fastening component, using a spindle to fasten the fastening component to a workpiece, wherein an upper end of the spindle is provided with the fastening component, a lower end of the spindle has a non-circular fitting portion, the fitting portion is configured to be fitted into a nut runner shaft, and the fastening method of the fastening component comprises:
   an installation step of installing the fastening component to the upper end of the spindle;

a first pressing step of raising the nut runner shaft while reversely rotating the nut runner shaft in a rotating direction opposite to a fastening direction to press the nut runner shaft against the non-circular fitting portion;

a second pressing step of raising the nut runner shaft while reversely rotating the nut runner shaft in the rotating direction opposite to the fastening direction to press the fastening component against the workpiece; and a fastening step of rotating the nut runner shaft forward in the fastening direction after the nut runner shaft is fitted into the fitting portion of the spindle.

2. The fastening method of the fastening component according to claim 1, further comprising:

a third pressing step of raising the nut runner shaft again when the contact between the fastening component and the workpiece is released to press the fastening component against the workpiece after the second pressing step; and performing the fastening step after the third pressing step.

* * * * *